US006826315B1

(12) United States Patent
Wickes

(10) Patent No.: US 6,826,315 B1
(45) Date of Patent: Nov. 30, 2004

(54) DIGITAL IMAGING DEVICE WITH IMAGE AUTHENTICATION CAPABILITY

(75) Inventor: William C. Wickes, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 614 days.

(21) Appl. No.: 09/660,890

(22) Filed: Sep. 13, 2000

(51) Int. Cl.[7] .......................... G06K 9/54; H04N 7/167; H04N 5/225; H04L 9/00

(52) U.S. Cl. ....................... 382/305; 380/202; 713/170; 348/207.1

(58) Field of Search ................................ 382/100, 116, 382/181, 305, 312; 358/3.28, 426.12, 434; 380/200, 202, 246, 247; 713/170, 176, 178, 168; 348/207.1

(56) References Cited

U.S. PATENT DOCUMENTS 5,499,294 A * 3/1996 Friedman ..................... 380/10
5,799,083 A * 8/1998 Brothers et al. .............. 380/20
5,828,751 A 10/1998 Walker et al. ................ 380/25
5,923,763 A 7/1999 Walker et al. ................ 380/51
5,956,404 A * 9/1999 Schneier et al. .............. 380/25
5,987,136 A * 11/1999 Schipper et al. .............. 380/25
6,094,722 A * 7/2000 Astola et al. ............... 713/176
6,269,446 B1 * 7/2001 Schumacher et al. ....... 713/176
6,332,193 B1 * 12/2001 Glass et al. ................. 713/170
6,418,223 B1 * 7/2002 Wootton et al. ............ 380/246
6,577,336 B2 * 6/2003 Safai ....................... 348/207.1

OTHER PUBLICATIONS

Friedman, G. "The Trustworthy Digital Image: Restoring Credibility to the Photographic Image", Sep. 2, 1993, pp. 905–909.

Walton, S., "Image Authentication for a Slippery New Age", Apr. 1995, Dr. Dobb's Journal.

* cited by examiner

*Primary Examiner*—Kanji Patel

(57) ABSTRACT

A method and apparatus for authenticating a digital file operates by generating an image file or other data file in a first device such as a camera. The file is processed using a function to generate a second data file, which is stored in the device. It is then determined if a suspect data file is identical to the image file by processing the suspect data file with the same function, and comparing the result with the second data file. The second data files for a multitude of images may be permanently stored in the device, and the function used to generate the second data file operates to ensure that the second data file is much smaller than the image data file.

15 Claims, 2 Drawing Sheets

10
14
12
22
16
20
26
24
30
32

DIGITAL IMAGING DEVICE WITH IMAGE AUTHENTICATION CAPABILITY

FIELD OF THE INVENTION

This invention relates to digital photography, and more particularly to verification of image authenticity.

BACKGROUND AND SUMMARY OF THE INVENTION

Digital photography enables users to take photographs without conventional chemically-based film, providing a number of advantages. A solid state image detector, such as a charge coupled device (CCD), records images which are stored electronically. Other devices such as scanners are also used to generate digital images.

Once a digital image is created by a camera or any other means, it becomes a data file that is essentially a string of binary bits. Other than the stored visual content of the image, the data contains no information about the image's physical source or time and location of origin. Like other types of computer files, an image data file may have appended to supplementary meta-data it that describe its origin. For example, the computer file itself may identify the time and date of the file's creation. However, both the image data and the meta-data are easily altered, with no means subsequently to establish whether there has been any alteration, even with a close examination of the data or image stored in the data.

Conventional film photographs may be physically examined by discerning experts to detect image alterations, as alterations to the physical film, paper and/or grain patterns can be identified. However, chemically-based film photographs do not necessarily document the sources, times and locations of their creation.

The ease and undetectability of the modification of digital images makes them inferior to film images for any purpose such as legal documentation or law enforcement where the integrity of the image is paramount. Moreover, the lack of positive, unalterable supplementary information associated with an image limits the utility of even conventional film photographs for certain critical evidentiary purposes.

The present invention overcomes the limitations of the prior art by providing a method and apparatus for authenticating a digital file. The method and apparatus operate by generating an image file or other data file in a first device such as a camera. The file is processed using a function to generate a second data file, which is stored in the device. It is then determined if a suspect data file is identical to the image file by processing the suspect data file with the same function, and comparing the result with the second data file. The second data files for a multitude of images may be permanently stored in the device, and the function used to generate the second data file operates to ensure that the second data file is much smaller than the image data file.

DETAILED DESCRIPTION OF A PREFERRED EMBODIMENT

Figure 1:
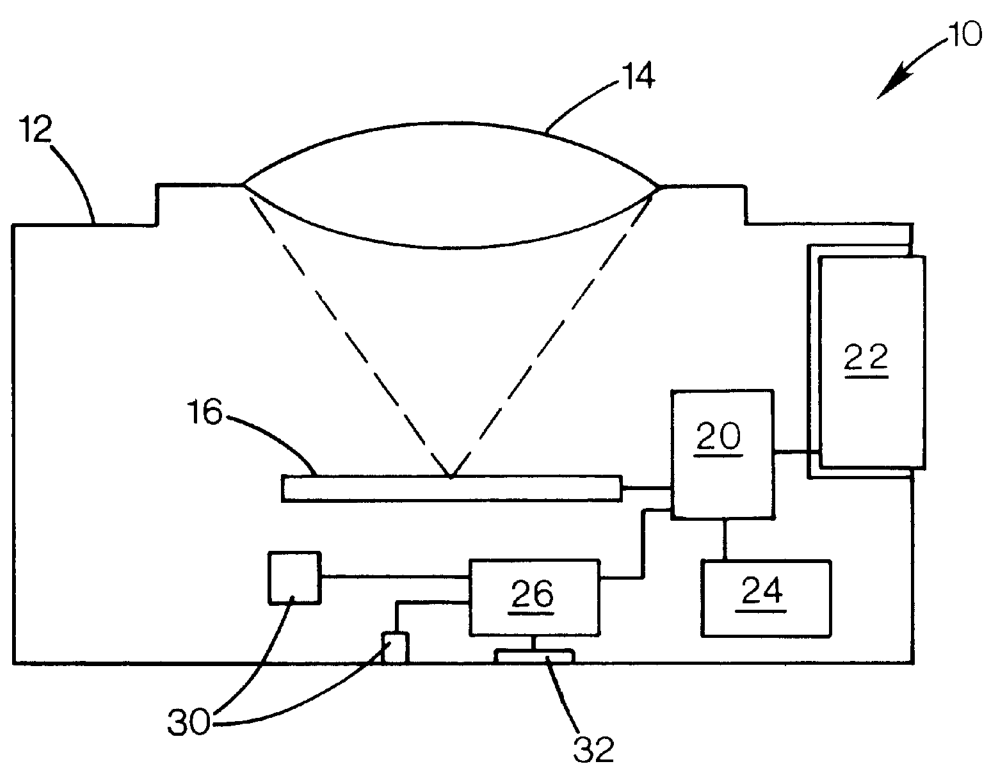
FIG. 1 shows a simplified block diagram of a camera according to the is preferred embodiment of the invention.

FIG. 1 shows a camera 10 having a housing 12 supporting a lens 14. The lens is focused on a CCD 16, which is connected to a processor 20 in the housing. The processor is connected to a main memory module 22, and to a second non-volatile memory module 24, which is permanently attached to the housing. A supplementary data collection chip 26 is also connected to the processor, and may include a clock, and connected transducers 30 that may include temperature sensors, GPS receivers, positional and orientation sensors, cell phone receiver, or other means to receive signals to receive or provide time, date, position, and any other information about the circumstances surrounding the generation of each image recorded. For instance, the camera's exposure data may be recorded, including exposure duration and lens aperture and type.

The processor includes a stored unique device identifier (ID) associated uniquely with the particular camera, or the ID may be stored in another component connected to the processor. The main memory 22 may be a RAM chip or removable media with significant capacity suitable for storing the data for a number of images. A typical size for a removable memory is 10–50 Mb, so that approximately 10–100 images of 0.5–1 Mb each, depending on the camera's compression method, may be stored before replacing the memory or out-loading the data is required. The memory is preferably removable as illustrated, or may be permanent, with a connector or other communication means for out-loading image data to an external storage or viewing device.

The secondary memory device 24 has a much smaller capacity than the main memory, typically about 1 Mb. This provides the storage capacity for the code files associated all the images expected to be recorded during the life of the camera, as will be discussed below. The code files are each in the range of 50–100 bytes, allowing 10,000–20,000 image codes to be stored. The memory 24 is permanently attached to the camera to ensure against tampering. In an alternative embodiment, the memory may be replaceable, and stored for archiving. In the preferred embodiment, an interface connector 32 connected to the memory 24 permits the reading of data stored in the memory.

The processor is shown as a central device connected to each of the other components. Alternatively, the components may also be connected to each other, such as by a data bus, or other means to permit communication among the components needed for the operations discussed below. The processor is discussed as having many functions. In alternative embodiments, various of these functions may be performed by dedicated devices connected to the processor.

Figure 2:
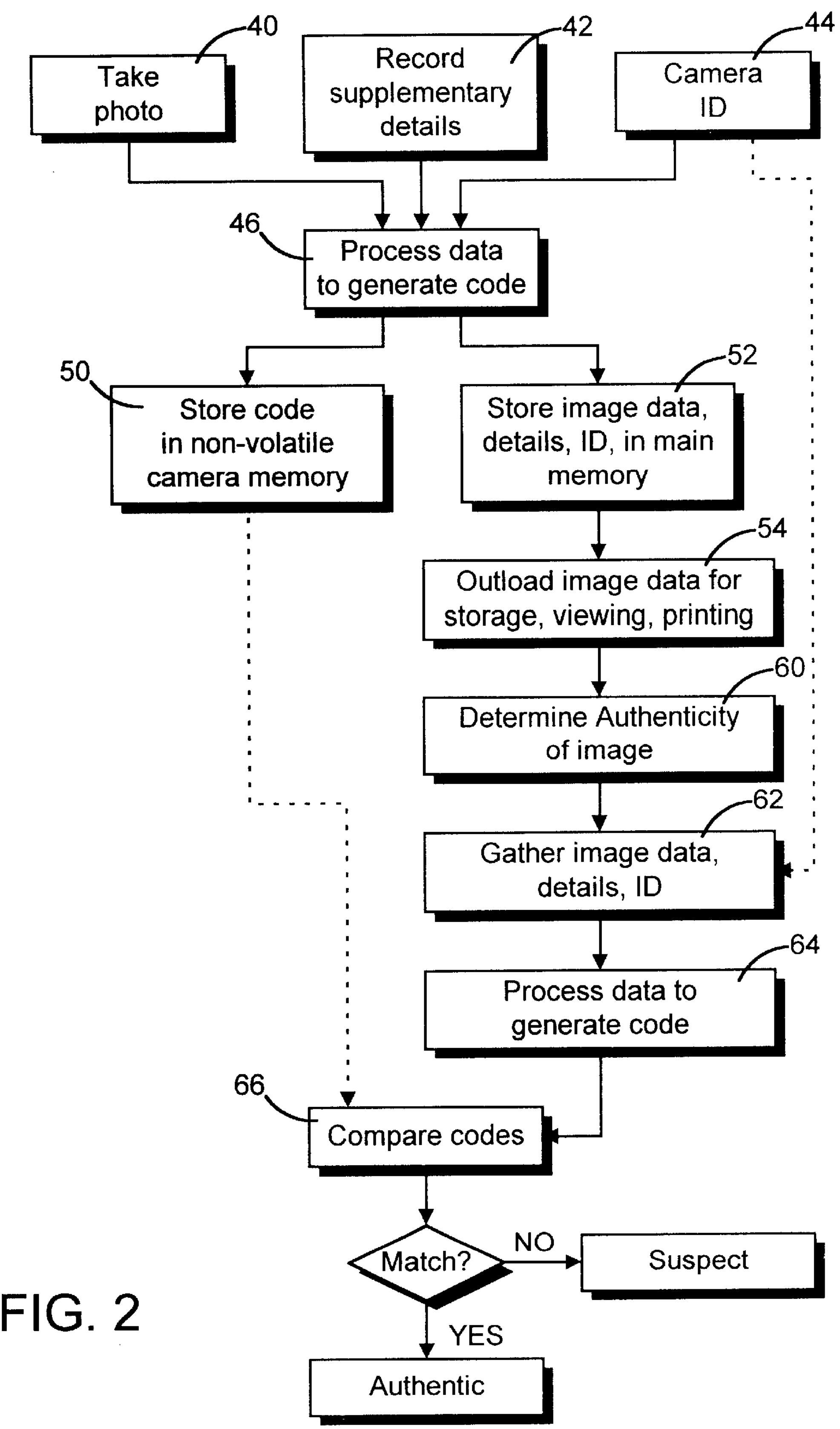
FIG. 2 shows a flow chart illustrating operation of the invention.

The process of operation proceeds as illustrated in FIG. 2. Each image is taken in step 40, by the lens focusing an optical image on the CCD, which records and stores an associated raw image data file and transmits it to the processor. As the photo is taken, the various clocks and transducers gather and record supplementary image data in step 42, and transmit the information to the processor. The processor accesses the device ID 44. The processor then processes the combined data of the image, supplementary data, and ID, to generate an Authentication Code (AC) at step 46. A record is added to the memory 24 that includes the image's AC. The code may be based on the image data alone, or may be based on the combined data. In step 50, the AC is transmitted to the memory 24, preferably along with at least some of the supplementary data, to enable the codes to be readily accessed and indexed, such as by exposure number, time, date, etc. Meanwhile, in step 52 the conventional image data file is stored in the camera's image memory for later transfer to other devices such as printers or digital archives, as in step 54.

The mathematical algorithm used for generating the AC file serves to create a file that is a unique function of the original data, small enough for compact storage, but large enough to make the probability minuscule that a different image data file would generate the same AC. Even if the same image file were only slightly modified in a small way, the probability of a common AC must be near zero, since one purpose of the invention is to detect just such manipulations that may not be noticeable to the naked eye. A common suitable function is the "checksum," which is any function that involves processing all or a substantial amount of the original data, to generate a resulting number. Typically, all the bits are added up to generate a very large number. To avoid storing a needlessly large number, all but the lest significant bits are truncated. The size of the resulting number, that is, the number of bits, is determined by a balancing test based on the needs of the application. Fewer bits permit more compact storage, while more bits provide more security against coincidentally (or fraudulently) identical results. With typical memory sizes available cost-effectively, the number of bits may be selected so that the probability of any two images yielding the same checksum is negligibly small, without any storage size concerns.

The computation of the checksum must be sufficiently complex that it would take any computer prohibitively long (or impossible) to modify the data file of an altered image to have a particular checksum (and without noticeably re-altering the altered image), either by deliberate computation or by trial and error. This can be achieved, for example, by computing two or more independent checksums for each image such that changing any image pixel values to satisfy one checksum would inevitably not satisfy the other(s).

The first condition is a tradeoff between the reliability of authentication and the size of the memory 24. A theoretically perfect but technically impractical checksum would be the entire actual image. However, with the cost and size of memory required, it would not be practical to store every image permanently in the camera. A 128-bit checksum is preferable, corresponding to a probability of $2^{-128}$ that two images could have the same AC or checksum by chance.

The second checksum condition is necessary to prevent the alteration of an image to yield some desired visual properties while preserving its AC by making subtle changes distributed throughout the image. A correct checksum algorithm will prevent this by making it effectively impossible to compute how to change the image to yield a preselected checksum. A further level of security could be provided by keeping the checksum algorithm secret and having a trusted party perform the authentication match between an image and its originating camera.

The authentication process proceeds when an image generated by the camera must be authenticated, such as to establish ownership of the image, or to demonstrate that the image was not tampered with, as well as to verify the supplementary data regarding the circumstances in which the image was generated. For instance, the condition of the image may not be suspect, but the time it was taken may require verification. The memory 24, fixed within the camera, provides the actual authentication of any images captured with that camera. The process begins at step 60, where the image to be analyzed is identified, and procured in electronic form in step 62 for analysis. The procured data must include all data used to generate the original AC or checksum, so if supplementary data and the device ID were part of the data to which the checksum function was applied, they must be gathered in the same form as when the checksum was generated. Preferably, each image file includes this information.

Analysis may proceed in step 64 in any computer (not shown) in which the subject image data is stored. The suspected data is processed by exactly the same function as was the original data, yielding a candidate authentication code (CAC). In step 66, the computer is connected to the camera via interface connector 32. The computer requests the camera to search through its authentication code memory for an entry matching the CAC. If a match is found, that indicates that the image and data in question were in fact created by that camera, and have not been altered. If no match is found, then the image did not originate with that camera, or has been altered in some way since its creation. In embodiments in which security is particularly critical, the camera may include unique stored data not readily accessible, which makes the function unique (such as by the multiplication with a large unique number in the generation of each AC), so that another device is incapable even of applying the function to image data. This prevents the data from being tested by a tamperer who seeks to manipulate the data in a way to generate the original AC.

The camera and its internal checksum computation process ensure against the possibility of entering inauthentic records into the memory 24, and any alteration of the image will prevent its authentication. The former is achieved by integrating the memory 24 and the recording process into dedicated camera hardware with no connectivity to external devices that might record false records into the memory 24. Likewise, if the camera includes time, date or location stamping with the AC, that data must also originate from hardware that cannot be modified short of physical alteration of the camera.

In the preferred embodiment, the camera has a selector that enables the user to select whether an image is to be recorded in an authenticatable format, or whether to conserve the memory 24 and record the image conventionally without storing the AC file.

While the above is discussed in terms of preferred and alternative embodiments, the invention is not intended to be so limited. For instance, the principles above may also be applied to almost any digital object and its associated hardware, such as images and scanners, digital videos and cameras, email communications, documents, and other computer generated files and computers on which they are created.

We claim:

1. A method of authenticating a digital file comprising:

generating a first data file in a first device;

processing the first data file using a selected function to generate a second data file, the selected function being a checksum function operable to generate the second data file;

storing the second data file in a non-volatile memory resident within the first device; and determining if a suspect data file is identical to the first data file by processing the suspect data file with the selected function, and comparing the result with the second data file.

2. The method of claim 1 wherein generating a first data file includes forming an image, and converting the image to the first data file.

3. The method of claim 2 wherein forming an image includes taking a digital photograph.

4. The method of claim 1 including storing the second data file in the first device.

5. The method of claim 1 wherein the first data file includes information about the generation of the first data file.

6. The method of claim 5 wherein the information includes at least one information element selected from the set of information elements consisting of a unique device identifier, the time of creation, location of creation, identity of creator, exposure data, and environmental data.

7. A digital imager comprising:

a transducer operable to generate an image data file from an image formed on the transducer;

a processor operable to generate a second data file based on the result of a selected function applied to the image data file, the selected function being a checksum function operable to generate the second data file that is used in determining if a suspect data file is identical to the first data file by processing the suspect data file with the selected function, and comparing the result with the second data file; and a memory device connected to the processor and operable to store the second data file in a non-volatile memory device being resident within the digital imager.

8. The apparatus of claim 7 wherein the imager is a digital camera.

9. The apparatus of claim 7 wherein the transducer is a CCD.

10. The apparatus of claim 7 wherein the memory is operable to store a multitude of different second data files, each corresponding to an image data file.

11. The apparatus of claim 7 including a supplementary data source operable to provide additional data for inclusion in the image data file.

12. The apparatus of claim 11 wherein the additional data includes at least one information element selected from the set of information elements including a unique device identifier, the time of creation, location of creation, identity of creator, exposure data, and environmental data.

13. The apparatus of claim 7 wherein the memory device is permanently attached to the imager.

14. A method of digital photography comprising:

converting an image formed in a digital imager to an image data file;

processing the image data file using a selected function to generate a smaller second data file based on the image data file, the selected function being a checksum function operable to generate the second data file that is used in determining if a suspect data file is identical to the first data file by processing the suspect data file with the selected function, and comparing the result with the second data file; and storing the second data file to a non-volatile memory device connected to the imager, and being resident with the imager.

15. The method of claim 14 including wherein processing the image data includes including supplementary data including at least one information element selected from the set of information elements including a unique device identifier, the time of creation, location of creation, identity of creator, exposure data, and environmental data.

* * * * *